Patented July 7, 1953

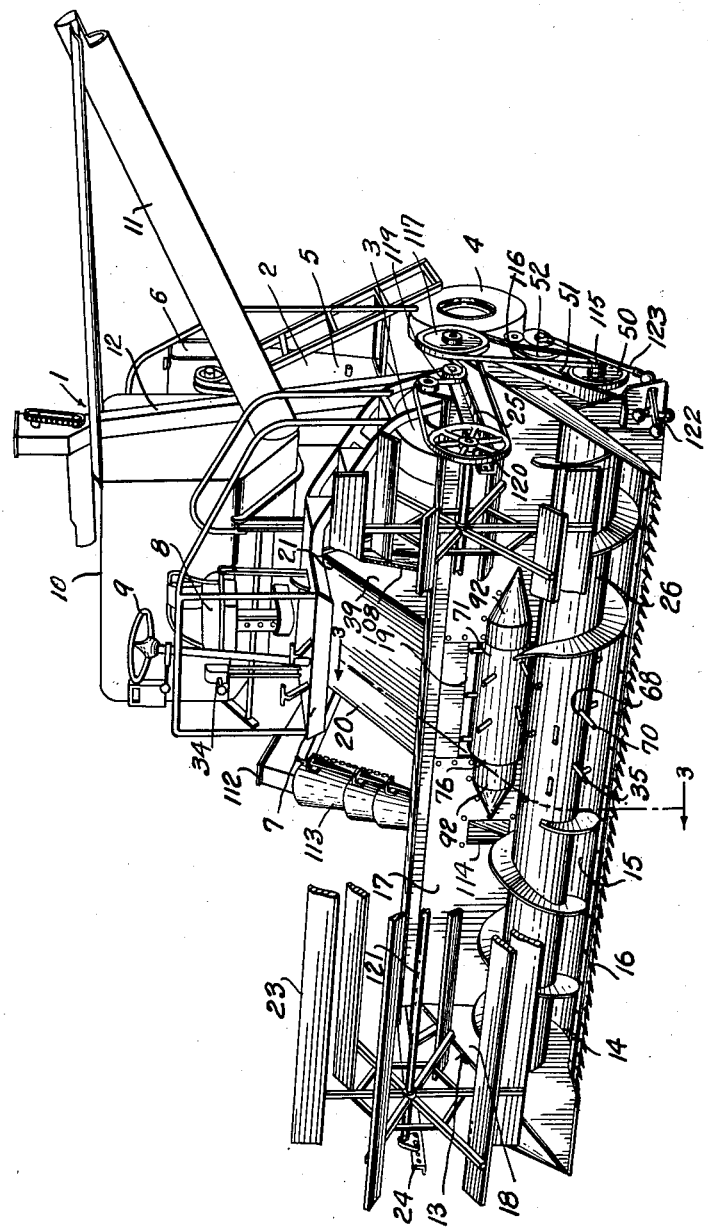

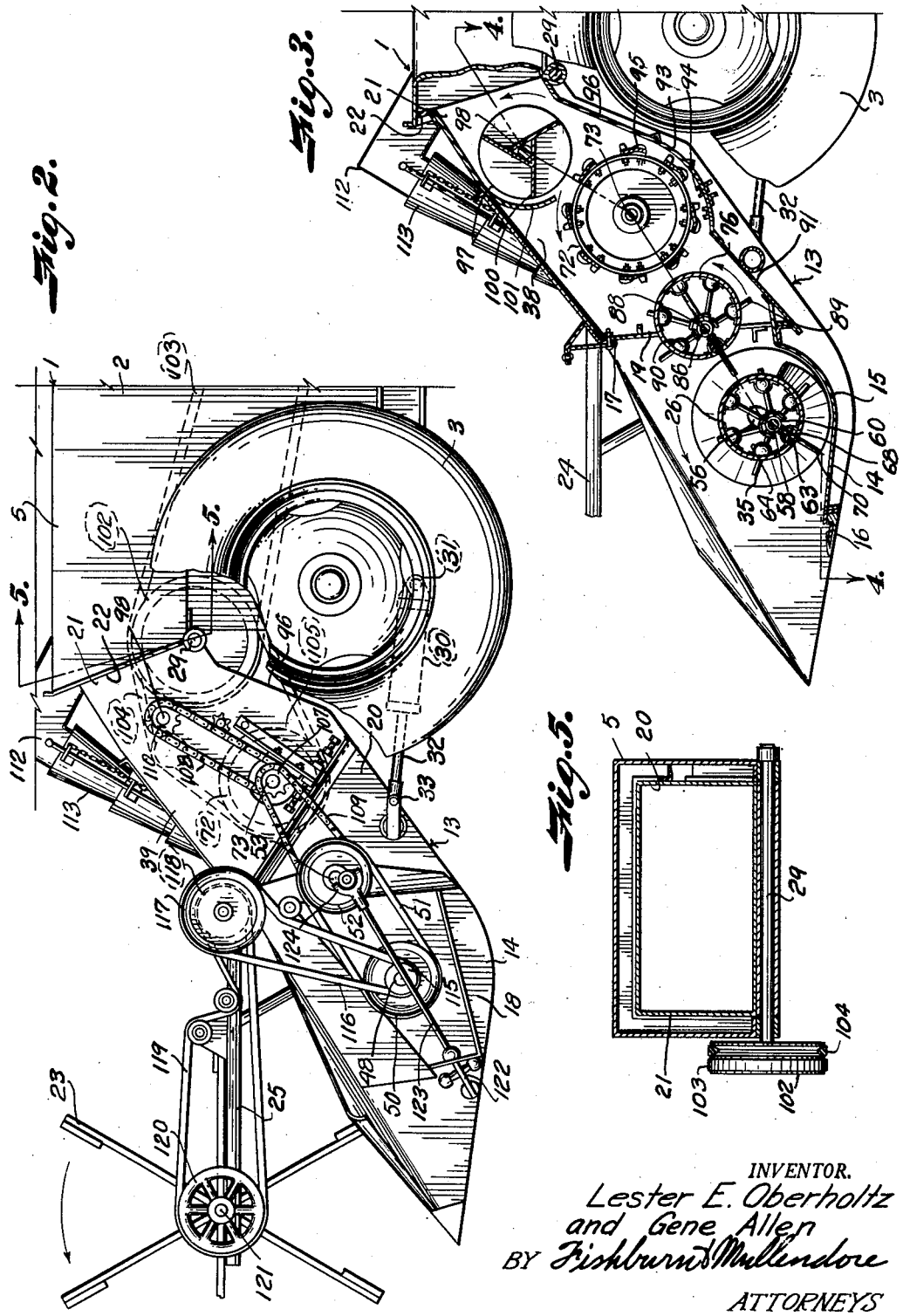

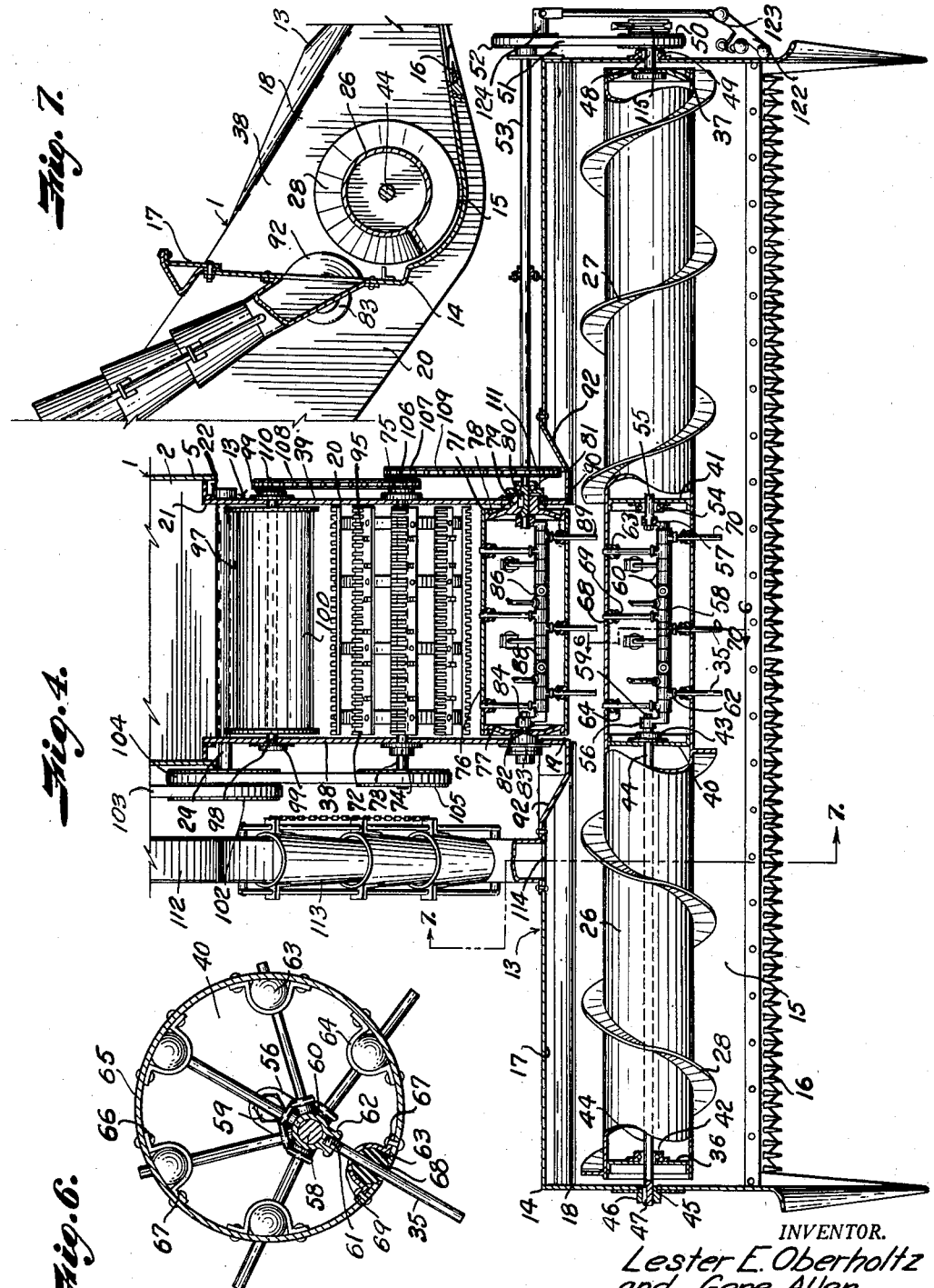

2,644,284

UNITED STATES PATENT OFFICE 2,644,284

SELF-PROPELLED COMBINE

Lester E. Oberholtz and Gene Allen, Independence, Mo., assignors to Gleaner Harvester Corporation, Independence, Mo., a corporation of Delaware Application October 18, 1950, Serial No. 190,854

1 Claim. (Cl. 56—21)

This invention relates to harvesting and threshing machines commonly known as combines and particularly those of the self-propelled type. Such machines usually include harvesting, threshing, and separating units with the threshing cylinder carried within the separator unit. Since the sickle portion of the harvester unit must be adjustable from substantially ground contact to a relatively high position, the distance between the sickle and threshing cylinder is relatively great, and a complicated conveyor system is required to carry grain cut by the sickle to the threshing cylinder. Usually such conveyor systems requires a raddle type elevating conveyor for elevating the grain to the threshing cylinder. Such an arrangement results in a machine having a high center of gravity and heavy in weight, as well as a poorly balanced and long coupled machine. These devices interfere with maneuverability of a machine of the self-propelled type.

The principal object of the present invention, therefore, is to provide a self-propelled light weight short-coupled machine having a low center of gravity and better balance on the traction wheels so as to promote maneuverability and general satisfactory operation of a self-propelled combine.

Other objects of the invention are to provide a simple conveying mechanism which utilizes the action of the threshing cylinder to assist in elevating the cut grain from the grain pan into the separating unit of the machine; and to provide simple means for changing the direction of travel of the cut grain in the pan to the threshing cylinder.

It is the further object of the invention to mount the threshing cylinder as a part of the harvesting unit so as to obtain the desired balance and provide a longer separating unit for a given length machine.

In accomplishing these and other objects of the invention as hereinafter pointed out, we have provided improved structure, the preferred form of which is illustrated in the accompanying drawings wherein:

Fig. 1 is a perspective view of a self-propelled combine constructed in accordance with the present invention, a portion of the reel being broken away to better illustrate the grain moving mechanisms of the harvesting unit.

Fig. 2 is an enlarged side elevational view with parts broken away of the front portion of the combine including the harvesting unit.

Fig. 3 is a longitudinal section through the portion of the machine illustrated in Fig. 2, taken on line 3—3, Fig. 1 particularly illustrating adjustable support of the harvesting unit, the threshing cylinder mounted therein, and the conveyor and feeding mechanisms for delivering cut grain to the cylinder and discharging the threshed grain from the cylinder into the separator unit of the machine.

Fig. 4 is a plan view of the portion of the machine illustrated in Fig. 2 with the grain pan and housing shown in horizontal section taken on line 4—4, Fig. 3.

Fig. 5 is a cross-section through the feeding portion of the threshing unit taken on line 5—5, Fig. 2 and particularly illustrating the shaft which pivotally carries the threshing unit and which furnishes the power for driving the various mechanisms forming a part of the threshing and harvesting units.

Fig. 6 is an enlarged transverse section through the pan conveyor of the harvesting unit taken on line 6—6, Fig. 4 particularly illustrating the projectable and retractable fingers for changing directions of movement of the cut grain.

Fig. 7 is a cross-section through the grain pan on the line 7—7, Fig. 4.

Referring more in detail to the drawings:

1 designates a self-propelled combine constructed in accordance with the present invention and which includes a separator unit 2 supported on laterally spaced front traction wheels 3 and rear dirigible wheels 4. The separator unit includes a housing 5 containing the separating mechanism (not shown) and which specifically forms no part of the present invention. Mounted on the housing 5 is a motor 6 that is suitably connected with the traction wheels 3 for propelling the machine over a field. The wheels 4 are steered by an operator stationed upon a platform 7 that projects forwardly from the upper portion of the separator housing 5 and which carries a seat 8 for the operator, a steering wheel 9 and various other controls necessary to operate the machine. Located above the housing 5 between the platform 7 and motor 6 is a hopper or bin 10 for containing the separated grain, the grain being discharged from the separator and elevated into the bin by an elevator mechanism generally designated 12. The grain is removed from the bin and discharged into a truck or like vehicle through a spout 11 containing a suitable conveyor (not shown).

In carrying out the present invention, the harvesting and threshing mechanism is carried as a separate unit bodily mounted for adjustment to the height of the grain to be harvested. The harvesting unit 13 includes a transverse grain pan 14 having the ends arranged symmetrically with the longitudinal median line of the separator unit. The grain pan includes a trough-like bottom 15 and has a cutter or sickle 16 extending along the front edge thereof for cutting grain. The opposite side of the pan includes a back or wind board 17 that extends a suitable distance above the bottom. The ends of the pan are closed by ends walls 18. Formed in the back board 17 is a discharge opening 19 that is located approximately midway of the width of the pan and rigidly connected therewith is a threshing cylinder housing 20 of substantially rectangular cross-section and having a discharge end 21 projecting into an open front end 22 of the separator housing 5.

The harvesting unit also includes a reel 23 of conventional design that is rotatably mounted above the sickle 16 on arms 24 and 25 carried by the ends of the pan. The reel 23 is driven in an anti-clockwise direction (Fig. 2) to deposit the grain cut by the sickle into the grain pan.

Rotatably mounted in the grain pan is a tubular shaft or drum 26 and which is provided with right and left spiral flights 27 and 28 that extend from the ends of the pan to terminate adjacent the respective sides of the opening 19 so that when the shaft is rotated, the spirals move the cut grain along the bottom of the pan from the outer ends thereof toward the mid-point for ultimate discharge into the housing 20.

The adjustable mounting of the threshing unit includes a transverse shaft 29 carried along the open forward end of the separator housing and on which the housing 20 is pivotally connected to swing on the axis thereof. The shaft 29 thus retains the discharge end of the housing 21 within the opening 22 as the harvesting unit is raised and lowered accordingly to the height of the grain. The harvesting unit is adjusted by means of hydraulic cylinders 30 (Fig. 2) pivotally mounted at one end 31 to the frame of the separator unit, at the respective sides thereof, and slideable from the opposite end of the cylinders under actuation of pistons (not shown) are rods 32 having pivotal connection as at 33 with the threshing cylinder housing 20. A suitable liquid is admitted to and from one or the other ends of the cylinders 30 by means of a valve 34 that is located adjacent the operator's position on the platform so as to raise and lower the harvesting unit by swinging the entire assembly on the axis of the shaft 29.

In order to change the direction of movement of the grain at the mid-point of the pan, the tubular shaft carries a plurality of radially arranged fingers or tines 35 as best illustrated in Fig. 6, and now to be described. The outer ends of the tubular shaft 26 are closed by heads 36 and 37 (Fig. 4) and inset within the tubular shaft substantially in plane with side walls 38 and 39 of the cylinder housing 20 are bulk heads 40 and 41. The head 36 and adjacent bulk head 40 carry anti-friction bearings 42 and 43 mounting a stationary shaft 44. The shaft 44 has its outer end projecting through the bearing 42, and is fixed to the end wall of the grain pan by means of a bracket 45 having a hub 46 in which the end of the shaft is anchored from rotation by a key 47. The head 37 at the opposite end of the tubular shaft carries a stub shaft 48 that is journalled in an anti-friction bearing 49 that is carried by the end wall of the pan. The spiral conveyor is driven by a pulley 50 fixed upon the stub shaft 48 and operated through a belt 51 running over a pulley 52 on a countershaft 53 that is carried on the rear side of the back board of the grain pan as best shown in Fig. 4.

With this arrangement, one end of the conveyor rotates upon the fixed shaft 44 while the other end is rotatably supported by the trunnion shaft rotating within the fixed bearing 49. Carried by the bulk head 41 in coaxial relation with the bearing 43 is an anti-friction bearing 54 journalling a stub shaft 55. Connected with the stub shaft 55 and with the adjacent end of the shaft 44 are crank arms 56 and 57 supporting the ends of an offset shaft 58. The shaft 58 is prevented from rotation by affixing the arm 56 to the end of the stationary shaft 44 by a suitable key and fastening means as indicated at 59, Figs. 4 and 6. Journalled on the crank shaft 58 are a plurality of collars or sleeves 60 arranged in end-to-end engagement and which carry the fingers 35, the fingers being threaded as indicated at 61 (Fig. 6) into laterally extending necks 62 of the collars as shown in Fig. 6. The fingers are slideably mounted in swivels 63 which are journalled on the inner side of the tubular shaft in brackets 64. The brackets 64 extend about the swivels and are secured to the wall 65 of the conveyor by suitable fastening devices 66 extending through ears 67 of the brackets, as best shown in Fig. 6.

The swivels may be formed of resilient material such as rubber to silence the action of the mechanism and to allow some flexibility of the fingers relatively to the tubular shaft. The fingers extend through slot-like openings 68 in the wall 65 and similar slots 69 in the brackets. With this arrangement, rotation of the conveyor in co-operation with the fixed crank shaft cause the fingers or tines to project on one side of the spiral conveyor adjacent the sickle 16 and to retract the opposite side, as shown in Fig. 6. The eccentric is set and maintained in fixed relationship with the fixed shaft 44 so that the fingers begin to project as they reach their upper position and move forwardly in the direction of the arrow indicated at Fig. 6, until they reach the full projected position as the ends 70 move over the center of the grain pan to change the direction of movement of the grain toward the inlet to the housing 20. As the fingers pass their lowermost position, they begin to retract and withdraw from the grain whereby the grain is left on the bottom of the pan to continue its changed direction. The movement of cut grain is continued by means of a rotary feeder 71 as later described.

In order that the separator housing may be made relatively long for a given length of machine to increase the separating surfaces and to lower the center of gravity of the machine, as well as provide better balance, the threshing cylinder designated 72 is mounted within the housing 20 so that it is carried by and forms a part of the threshing unit which carries the harvesting unit.

The threshing cylinder 72 is of the rasp type and is carried on a shaft 73 that is journalled in suitable bearings 74 and 75 (Fig. 4) carried by the side walls 38 and 39 of the housing at a point inwardly spaced from the inlet to accommodate the rotary feeder 71.

The rotary feeder 71 includes a tubular drum 76 having closed ends 77 and 78. The head 78 includes a hub 79 that is secured to the end of the countershaft 53 by a key 80 so that rotation of the countershaft effects rotation of the feeding cylinder, the shaft being mounted in a suitable anti-friction bearing 81 that is fixed to the outer side of the wall 39 of the housing 20 as shown in Fig. 4. The opposite head 77 is journalled on a stub shaft 82 that is fixed in a bracket 83 attached to the side wall 38 of the housing 20. Fixed to the stub shaft 82 is a crank arm 84 that cooperates with a crank arm 85 on the shaft 53 in carrying an eccentric or crank shaft 86 within the rotary drum, the crank arm 85 being loosely journalled on the extended inner end of the shaft 53 as best shown in Fig. 4. Mounted on the crank or offset shaft are a plurality of collars 88 carrying fingers 89 or tines that are reciprocally mounted within swivel members 90 in the same manner as the fingers previously described. The eccentric shaft is set so that the fingers begin to project as they move over top center position and are at their greatest projection when they register with the axis of the spiral conveyor. The projecting fingers therefore engage grain released by the retracted fingers on the conveyor to carry the grain through the opening 19 and discharge it up the inclined bottom 91 (Fig. 3) of the housing 20 and into the threshing cylinder, the fingers being retracted within the cylindrical feeder as they move upwardly adjacent the threshing cylinder, eliminate any carry over of the grain and allow the feeder to be located immediately adjacent the threshing cylinder, as shown in Figs. 3 and 4. The end portions of the feeder cylinder that project inwardly of the grain pan 14 may be protected with shields 92 attached to the back board 17 and prevent catching of grain upon the feeder cylinder.

Incorporated in the bottom 91 of the housing is a concave 93 having transverse bars 94 cooperating with the rasp bars 95 of the cylinder to thresh the grain and discharge the threshed grain with substantial velocity up a continuation 96 of the inclined bottom portion of the threshing cylinder housing and into the inlet end of the separator housing. It is thus obvious that the centrifugal action and air velocities produced by the rotating cylinder act upon the threshed grain to effect elevation thereof into the housing of the separator unit without the necessity of supplementary conveyors as above mentioned.

In order to cooperate with the cylinder in additionally threshing the grain and to assure discharge of the grain into the separator, the threshing cylinder housing preferably includes a rotary beater 97 which is mounted on a shaft 98 having its ends journalled in suitable bearings 99 carried by the side walls 38 and 39 at a point above and to the rear of the threshing cylinder. The beater 97 preferably includes a plurality of transverse blades 100 that revolve in fanning and beating relation with respect to the threshed grain discharged by the threshing cylinder. A curved guard 101 (Fig. 3) is provided on the front side of the beater and terminates over the cylinder to prevent threshed grain from being carried about by the cylinder.

The pivot shaft 29 on which the harvesting unit is adjustably mounted carries a drive pulley 102 that is actuated from the motor 6 through a belt 103 in any suitable manner. The threshing cylinder 72 is actuated from the pulley 102 by a belt 104 that operates over a pulley 105 on the shaft 73 of the threshing cylinder. The opposite end of the threshing cylinder shaft carries sprockets 106 and 107 and operating thereover are endless chains 108 and 109 to actuate sprockets 110 and 111 on the shaft 98 and countershaft 53 respectively.

The tailings from the separator are returned to the grain pan by an elevator indicated at 112 having a flexible spout 113 discharging through an opening 114 in the back of the grain pan as best shown in Figs. 1 and 4.

The sickle 16 and reel 23 may be driven in any desired manner since the drives do not form a part of the present invention. However, in the illustrated instance, the reel is driven from the spiral conveyor stub shaft 48 by a pulley 115 that is fixed relatively to the driving pulley 50 and operates a belt 116 running over a pulley 117 that is journalled on the grain pan. The pulley has a pulley 118 connected therewith which operates a belt 119 running over the pulley 120 on the reel shaft 121. The sickle 16 is actuated by bell crank 122 that is connected by a link 123 operated through an eccentric 124 on the shaft 53.

In using the machine, the engine 6 thereof drives the traction wheels 3 to propel the machine across the field, the movement of the machine and various mechanisms thereof being under control of the operator seated on the platform 7. The operator will manipulate the valve 34 to actuate the pistons in the cylinders 30 so as to maintain the sickle at the proper cutting height, the entire harvesting unit including the thresher portion pivoting about the axis of the shaft 29. When the machine is in operation and moving along a field, the sickle will cut the grain and the heads will drop into the grain pan where they are engaged by the spirals 27 and 28 and moved from the ends of the pan toward the opening 19. As the spirals 27 and 28 push the material along the pan it would ordinarily bunch across the opening 19, but the fingers 35 engage the grain and direct it toward the opening. As the conveyor carries the fingers 35 upwardly on the side adjacent the pick-up cylinder, the fingers are gradually retracted to release the grain and prevent carrying of the grain back over the conveyor. The fingers on the pick-up cylinder then engage the grain and continue the movement thereof into the threshing cylinder by raking it along the inclined bottom 91. As the fingers move upwardly in the direction of the cylinder, they gradually retract to release the grain and assure movement thereof between the threshing cylinder and concave. The threshing action of the cylinder and the air currents generated incidental to rotation thereof direct the threshed material with considerable velocity up the inclined bottom portions 96 with the aid of the beater 97 so that the material is discharged into the separator unit.

It is obvious that with the cylinder carried as a part of the harvesting unit, the entire machine is better balanced on the traction wheels and a lower center of gravity may be maintained thereby providing for shorter carry of the grain from the sickle to the separator unit and eliminate the necessity of extensive conveyor mechanisms such as the above mentioned raddles and the like.

What we claim and desire to secure by Letters Patent is:

In a self propelled combine having a wheel supported separator housing and a separator mechanism therein, said separator housing having an inlet opening in the forward portion thereof, a thresher housing pivotally mounted on the forward portion of the separator housing for vertical swinging movement about a horizontal axis, said thresher housing having a discharge opening registering with the opening in the separator housing and extending forwardly and downwardly therefrom, a harvester unit including a cutter carried by the forward end of the thresher housing, a spiral conveyor in the harvester unit for moving cut grain laterally to a point in longitudinal registry with the thresher housing, a threshing cylinder in the thresher housing rearwardly of the harvesting unit, direction changing means on the spiral conveyor for directing cut grain toward the threshing cylinder, and a rotary feeder between the direction changing means and the threshing cylinder for picking up and discharging the cut grain directly to the threshing cylinder.

LESTER E. OBERHOLTZ.
GENE ALLEN.

References Cited in the file of this patent

UNITED STATES PATENTS

| Number | Name | Date |
|---|---|---|
| 1,932,714 | Thoen | Oct. 31, 1933 |
| 2,455,905 | Ronning et al. | Dec. 7, 1948 |
| 2,470,704 | Korsmo et al. | May 17, 1949 |
| 2,529,180 | Oehler | Nov. 7, 1950 |